(12) United States Patent
Plum et al.

(10) Patent No.: US 11,132,469 B2
(45) Date of Patent: Sep. 28, 2021

(54) SUSPICIOUS ACTIVITY MONITORING MEMORY SYSTEM

(71) Applicant: Micron Technology, Inc., Boise, ID (US)

(72) Inventors: Todd J. Plum, Boise, ID (US); Scott D. Van De Graaff, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 260 days.

(21) Appl. No.: 16/387,114

(22) Filed: Apr. 17, 2019

(65) Prior Publication Data
US 2020/0334385 A1 Oct. 22, 2020

(51) Int. Cl.
| | |
|---|---|
| H04L 29/08 | (2006.01) |
| H04L 29/06 | (2006.01) |
| G06Q 30/02 | (2012.01) |
| G06F 16/957 | (2019.01) |
| G06F 21/79 | (2013.01) |
| G11C 16/34 | (2006.01) |
| G08B 21/18 | (2006.01) |
| G06F 21/86 | (2013.01) |

(52) U.S. Cl.
CPC .............. *G06F 21/79* (2013.01); *G06F 21/86* (2013.01); *G08B 21/182* (2013.01); *G11C 16/349* (2013.01)

(58) Field of Classification Search
CPC ....... G06F 21/79; G06F 21/86; G11C 16/349; G08B 21/182
See application file for complete search history.

(56) References Cited

U.S. PATENT DOCUMENTS

| | | | | |
|---|---|---|---|---|
| 8,692,325 | B2* | 4/2014 | Yanagi | H01L 29/7835 257/343 |
| 9,257,995 | B2 | 2/2016 | Van De Graaff | |
| 2015/0372678 | A1* | 12/2015 | Zhang | H03K 17/0822 327/109 |
| 2019/0265293 | A1* | 8/2019 | Fifield | G01R 31/2856 |
| 2020/0341047 | A1* | 10/2020 | Suzuki | H03K 17/18 |

OTHER PUBLICATIONS

Threshold voltage shift and drain current degradation by negative bias temperature instability in Si (110) p-channel metal-oxide-semiconductor field-effect transistor https://aip.scitation.org/doi/10.1063/1.4722796 (Year: 2012).*
"Long-term data for BTI degradation in 32nm IBM Microprocessor Using HKMG Technology"—Lu et al, IBM Research, IBM System and Technology Group, Mar. 2015 https://ieeexplore.ieee.org/stamp/stamp.jsp?arnumber=7112756 (Year: 2015).*

(Continued)

*Primary Examiner* — Randy A Scott
(74) *Attorney, Agent, or Firm* — Fletcher Yoder, P.C.

(57) ABSTRACT

The present disclosure relates generally to semiconductor devices, and, in particular, to memory devices with a data-recording mechanism. A duration of time that a memory device operates in excess of an operational parameter may be tracked via intentional degradation to a transistor. One or more signals that result from the intentional degradation to the transistor may be leveraged to generate alarms and/or be otherwise used in a memory device control circuit and/or system.

16 Claims, 6 Drawing Sheets

(56) References Cited

OTHER PUBLICATIONS

U.S. Appl. No. 16/138,900, filed Sep. 21, 2018, Todd J. Plum.
Chaudhary, S. K. et al., "Development of Field Data Logger for Recording Mission Profile of Power Converters", 2015 17th European Conference on Power Electronics and Applications, Sep. 8-10, 2015, p. 1-10 DOI: 10.1109/EPE.2015.7311717.
Huard, V. et al., "Adaptive Wearout Management with in-situ aging monitors", 2014 IEEE International Reliability Physics Symposium, Jun. 1-5, 2014, p. 6B.4.1-6B.4.11, DOI: 10.1109/IRPS.2014.6861106.
Liang, et al., "Mission Profiles Derived from Lifetests and Field Return Data Using Inverse Problem Theory", 2014 IEEE International Reliability Physics Symposium, Jun. 1-5, 2014, p. 36.2.1-36.2.5, DOI: 10.1109/IRPS.2014.6860616.
Lu, P.-F. et al., "Long-term data for BTI degradation in 32nm IBM microprocessor using HKMG technology", 2015 IEEE International Reliability Physics Symposium, Apr. 19-23, 2015, p. 6A.2.1-6A.2.5, DOI: 10.1109/IRPS.2015.7112756.
Mhira, S. et al., "Mission profile recorder: An aging monitor for hard events", 2016 IEEE International Reliability Physics Symposium (IRPS), Apr. 17-21, 2016, p. 4C-3-1-4C-3-5, DOI: 10.1109/IRPS.2016.7574539.

\* cited by examiner

SUSPICIOUS ACTIVITY MONITORING MEMORY SYSTEM

BACKGROUND

The present disclosure relates generally to semiconductor devices, and, in particular, to memory devices with a data-recording mechanism.

Semiconductor devices (e.g., processors, memory systems, or the like) may include semiconductor circuits to store and/or process information. An example semiconductor device is a memory device. The memory device may include volatile memory devices, non-volatile memory devices, or a combination device. Memory devices, such as dynamic random-access memory (DRAM), may use electrical energy to store and/or access data. For example, the memory devices may include Double Date Rate (DDR) random-access memory (RAM) devices that use DDR interfacing schemes (e.g., DDR4, DDR5) for high-speed data transfers.

To facilitate the collection of data about the utilization and real-world operating parameters of a semiconductor device, it may be helpful to use data loggers in memory devices to monitor and record such data during usage for later retrieval. This data may be used in diagnostic operations, gathering population data to improve an understanding of conditions and/or environments that the products may be used in, or the like. However, data-logging in volatile memory devices may be challenging.

BRIEF DESCRIPTION OF THE DRAWINGS

Various aspects of this disclosure may better be understood upon reading the following detailed description and upon reference to the drawings in which.

DETAILED DESCRIPTION

As an alternative to a non-volatile memory-based data logger, it may be possible to store relevant operating data in less power and space-inefficient ways. For example, if a desired type of operating data involves a duration over which an operating parameter has been experienced (e.g., how many hours a device has been operated in a particular operating temperature range), data logging circuits which utilize a time-dependent change of a material property may be used. One such data logging circuit involves a Complementary metal-oxide-semiconductor (CMOS) device (e.g., a p-channel CMOS (PMOS) device or an n-channel (NMOS) device) circuit that experiences a material degradation proportional to the time for which a known voltage has been applied to a gate thereof. By utilizing such CMOS degradation-based data logging circuits to measure the durations over which different operating parameters have been experienced by a device, it is possible to obtain large quantities of valuable operating data with a small investment of circuit space and power.

As described in greater detail below, the technology disclosed herein relates to electronic systems, including memory devices, systems with memory devices, and related methods for storing conditional and/or usage information thereof. The electronic systems (e.g., dynamic random-access memory (DRAM) devices) may include degradation-based storage circuits (e.g., a CMOS degradation-based data logger) configured to collect and store information regarding the duration for which different operating characteristics (e.g., device modes) and/or environmental conditions (e.g., device operating temperatures), are experienced by the electronic systems.

The degradation-based storage circuits may function as low-cost embedded data-loggers that record various information related to an end-user's utilization of the electronic devices/systems. The recorded usage information (e.g., the duration for which different temperature ranges, operating modes, asserted signals, utilized addresses, or the like were experienced) may be used to diagnose operations, improve usage models, revise design specifications, or the like.

In some embodiments, the degradation-based storage circuits may each include a trigger circuit corresponding to a desired parameter or combination of parameters for which a duration is to be measured for coupling a predetermined voltage to the gate of a CMOS device to cause degradation for the duration in which the targeted condition or criteria is active. By degrading the corresponding CMOS device each time the targeted condition(s) occur during operation of the electronic devices/systems, the cumulative degradation of the CMOS device (which may be measured via a circuit that measures a trigger voltage of the CMOS device) may be used to determine the cumulative duration for which the corresponding trigger condition was active.

Because the potential degradation of a single CMOS device is not infinite, various embodiments may provide various connection topologies for coupling multiple CMOS devices to one or more trigger circuits (e.g., backup transistors) so that exhausted or defective CMOS devices may be swapped for fresh, not-yet-degraded CMOS devices. This may permit monitoring durations to continue longer than a single CMOS may permit (e.g., an operational time period of one transistor). Examples of these various embodiments, as well as other information related to degradation-based monitoring techniques and/or descriptions related to particular sensing circuitry described generally herein (such as in reference to FIG. 3), are discussed in co-pending and commonly assigned U.S. patent application Ser. No. 16/138, 900, entitled "A SEMICONDUCTOR DEVICE WITH A DATA-RECORDING MECHANISM" and filed on Sep. 21, 2018. This application is incorporated by reference herein and in its entirety.

Because the cumulative degradation of the CMOS device is predictable, the output from a recording circuit (e.g., a circuit that outputs and/or determines a trigger voltage of the CMOS device and/or a circuit that outputs and/or determines signal corresponding to a material degradation proportional to a duration of time that a stress signal is applied to a circuit, such as a CMOS device) may be determined to correspond to different alarm levels, and thus may be used in a larger control system and/or monitoring system. In this way, the recording circuit output may be provided to a sensitivity detector within a detection block to generate an alarm signal based on a reference voltage within the detection block defining when the alarm signal is generated. It is noted that any number of recording circuits, outputs, sensitivity detectors, detection blocks, and generated alarms may be used in any suitable combination with each other, in addition to the particular examples described herein. This described alarm system may benefit from each of the benefits afforded to the electronic devices/systems (e.g., the operation of the electronic devices/systems) and thus may provide an improved monitoring and/or detection circuit at least in the ways described above and at least relative to current monitoring and detecting techniques.

Figure 1:
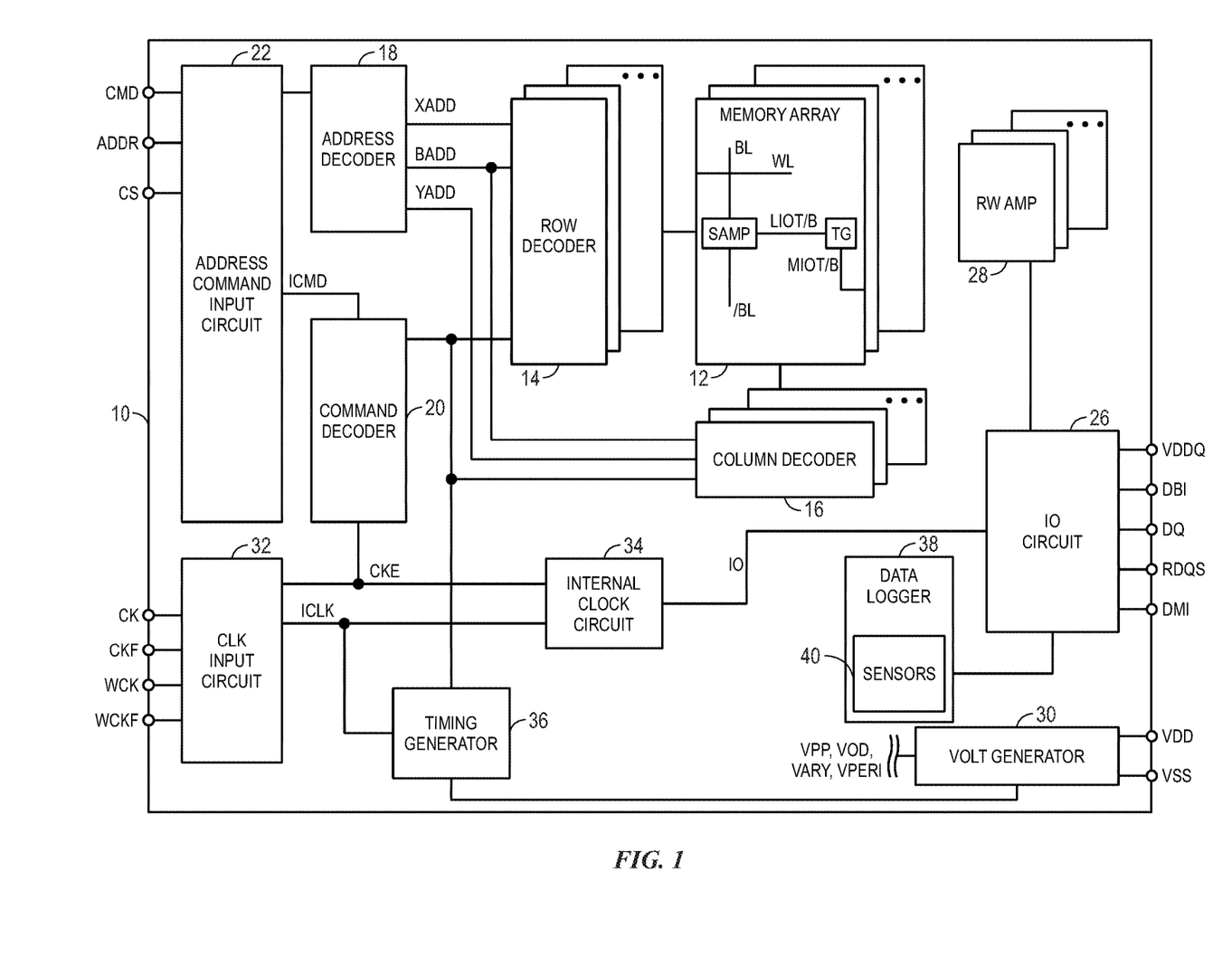
FIG. 1 is a block diagram of a memory device, in accordance with an embodiment of the present disclosure.

Keeping the forgoing in mind, FIG. 1 is a block diagram of an electronic device (e.g., a semiconductor memory device, such as a DRAM device). The memory device 10 may include an array of memory cells, such as memory array 12. The memory array 12 may include banks (e.g., banks 0-15 in the example of FIG. 1). Each bank may include word lines (WL), bit lines (BL), and memory cells arranged at intersections of word lines and the bit lines. Memory cells may include any one of a number of different memory media types, including capacitive, magnetoresistive, ferroelectric, phase change, or the like. The selection of a word line may be performed by a row decoder 14, and the selection of a bit line may be performed by a column decoder 16. Sense amplifiers (SAMP) may be provided for corresponding bit lines and connected to at least one respective local input/output (I/O) line pair (LIOT/B), which may in turn be coupled to at least a respective one main I/O line pair (MIOT/B), via transfer gates (TG), which may operate as switches. The memory array 12 may also include plate lines and corresponding circuitry for managing their operation.

The memory device 10 may use external terminals that include command and address terminals coupled to a command bus and an address bus to receive command signals (CMD) and address signals (ADDR), respectively. The memory device 10 may further include a chip select terminal to receive a chip select signal (CS), clock terminals to receive clock signals (CK and CKF), data clock terminals to receive data clock signals (WCK and WCKF), data terminals (DQ, RDQS, DBI, and DMI), and power supply terminals (VDD, VSS, VDDQ, and VSSQ).

The command terminals and address terminals may be supplied with an address signal and a bank address signal from outside. The address signal and the bank address signal supplied to the address terminals may be transferred, via a command address input circuit 22, to an address decoder 18. The address decoder 18 may receive the address signals and supply a decoded row address signal (XADD) to the row decoder 14, and a decoded column address signal (YADD) to the column decoder 16. The address decoder 18 may also receive the bank address signal (BADD) and supply the bank address signal to both the row decoder 14 and the column decoder 16.

The command and address terminals may be supplied with command signals (CMD), address signals (ADDR), and chip select signals (CS), from a memory controller. The command signals may represent various memory commands from the memory controller (e.g., including access commands, which may include read and/or write commands). The select signal may be used to select the memory device 10 to respond to commands and address provided to the command and address terminals. When an active chip select signal is provided to the memory device 10, the commands and addresses may be decoded and memory operations may be performed. The command signals may be provided as internal command signals (ICMD) to a command decoder 20 via a command address input circuit 22. The command decoder 20 may include circuits to decode the internal command signals to generate various internal signals and commands for performing memory operations, such as a row command signal to select a word line and a column command signal to select a bit line. The internal command signals may also include output and input activation commands, such as clocked command (CMDCK). The command decoder 20 may further include one or more registers for tracking various counts or values (e.g., counts of refresh commands received by the memory device 10 and/or self-refresh operations performed by the memory device 10).

When a read command is issued and a row address and a column address are timely supplied with the read command, the read data may be read from memory cells in the memory array 12 designated by the row address and column address. The read command may be received by the command decoder 20, which may provide internal commands to the I/O circuit 26 so that read data may be output from the data terminals via read/write amplifiers 28 and the I/O circuit 26 according to the clock signals. The read data may be provided at a time defined by read latency information (RL) that may be programmed in the memory device 10, such as in a mode register (not shown in FIG. 1). The read latency information may be defined in terms of clock cycles of the clock signal (CK). For example, the read latency information may be a number of clock cycles of the clock signal (e.g., CK) after the read command is received by the memory device 10 when the associated read data is provided.

When a write command is issued and a row address and a column address are timely supplied with the write command, write data may be supplied to the data terminals according to the clock signals (e.g., WCK and WCKF). The write command may be received by the command decoder 20, which may provide internal commands to the I/O circuit 26 so that the write data is received by data receivers in the I/O circuit 26, and supplied via the I/O circuit 26 and the read/write amplifiers 28 to the memory array 12. The write data may be written in the memory cell designated by the row address and the column address. The write data may be provided to the data terminals at a time that is defined by write latency (WL) information. The write latency information may be programmed in the memory device 10, such as in the mode register (not shown in FIG. 1). The write latency information may be defined in terms of clock cycles of the clock signal (CK). For example, the write latency information may be a number of clock cycles of the clock signal (CK) after the write command is received by the memory device 10 when the associated write data is received.

The power supply terminals may be supplied with power supply potentials (VDD and VSS). These power supply potentials (VDD and VSS) may be supplied to an internal voltage generator circuit 30. The internal voltage generator circuit 30 may generate various internal potentials (VPP, VOD, VARY, VPERI, and the like) based on the power supply potentials (VDD and VSS). The internal potential (VPP) may be used in the row decoder 14, the internal potentials (VOD and VARY) may be used in the sense amplifiers included in the memory array 12, and the internal potential (VPERI) may be used in many other circuit blocks.

The power supply terminal may also be supplied with a power supply potential (VDDQ). The power supply potential (VDDQ) may be supplied to the I/O circuit 26 together with the power supply potential (VSS). The power supply potential (VDDQ) may be the same potential as the power supply potential (VDD) in an embodiment of the present technology. The power supply potential (VDDQ) may be a different potential from the power supply potential (VDD) in another embodiment of the present technology. However, the dedicated power supply potential (VDDQ) may be used for the I/O circuit 26 so that power supply noise generated by the I/O circuit 26 does not propagate to the other circuit blocks.

The clock terminals and data clock terminals may be supplied with external clock signals and complementary external clock signals. The external clock signals (CK, CKF, WCK, and WCKF) may be supplied to a clock input circuit 32. Some clock signals (CK and CKF, WCK and WCK) may be complementary. Complementary clock signals may have opposite clock levels and transition between the opposite clock levels at the same time. For example, when a clock signal is at a low clock level, a complementary clock signal is at a high level, and when the clock signal is at a high clock level, the complementary clock signal is at a low clock level. Moreover, when the clock signal transitions from the low clock level to the high clock level, the complementary clock signal transitions from the high clock level to the low clock level, and when the clock signal transitions from the high clock level to the low clock level, the complementary clock signal transitions from the low clock level to the high clock level.

Input buffers included in the clock input circuit 32 may receive the external clock signals. For example, when enabled by a signal (CKE) from the command decoder 20, an input buffer may receive the clock signals (CK, CKF, WCK, and WCKF). The clock input circuit 32 may receive the external clock signals to generate internal clock signals (ICLK). The internal clock signals may be supplied to an internal clock circuit 34. The internal clock circuit 34 may provide various phase and frequency controlled internal clock signals based on the received internal clock signals and a clock enable signal (CKE) from the command address input circuit 22. For example, the internal clock circuit 34 may include a clock path (not shown in FIG. 1) that receives the internal clock signals and provides various clock signals to the command decoder 20. The internal clock circuit 34 may further provide input/output (I/O) clock signals. The I/O clock signals used as a timing signal may be supplied to the I/O circuit 26 for determining an output timing of read data and the input timing of write data. The I/O clock signals may be provided at multiple clock frequencies so that data may be output from and/or input to the memory device 10 at different data rates. A higher clock frequency may be desirable when high memory speed is desired. A lower clock frequency may be desirable when lower power consumption is desired. The internal clock signals may also be supplied to a timing generator 36 and used to generate various internal clock signals.

The memory device 10 may be coupled to any suitable electronic device that uses at least a portion of memory for temporary and/or persistent storage of information as a host device. For example, the host device may include a desktop or portable computer, a server, a hand-held device (e.g., a mobile phone, a tablet, a digital reader, a digital media player), or at least a portion of processing circuitry, such as a central processing unit, a co-processor, a dedicated memory controller, or the like. The host device may sometimes be a networking device (e.g., a switch, a router) or a recorder of digital images, audio and/or video, a vehicle, an appliance, a toy, or any one of a number of other products. In one embodiment, the host device may be connected directly to memory device 10, although in other embodiments, the host device may be indirectly connected to the memory device 10 (e.g., over a networked connection or via communication with intermediary devices).

The memory device 10 may include a data logging circuit 38 (data logger) for logging data from one or more sensors 40 and/or from other components of the device (e.g., the address command input circuit 22, one or more of the decoders 14/16/18/20). The data logging circuit 38 may include a complementary metal-oxide-semiconductor (CMOS) device (e.g., a p-channel CMOS (PMOS) device or an n-channel (NMOS) device) configured to degrade (e.g., negative-bias temperature instability-based (NBTI-based) degradation and/or carrier hot channel-based (CHC-based) degradation according to the targeted usage information. In this way, the data logging circuit 38 is a network of sensors, measuring circuitry, and recording circuitry. The memory device 10 may further adjust and/or vary the amount of degradation for each occurrence to compensate for other factors or conditions (e.g., operating temperature) that influence degradation. In some embodiments, the memory device 10 may adjust the amount of degradation by adjusting a stress voltage used to degrade the CMOS. In some embodiments, the memory device 10 may adjust a duty cycle of a stress input used to degrade the CMOS. Although shown as a separate functional block in FIG. 1, the memory device 10 may include the data logging circuit 38 within any of the other components described above, such as the command address input circuit 22, the I/O circuit 26, or the like. Also, the memory device 10 may include other connections for the data logging circuit 38. For example, the data logging circuit 38 may be coupled to other circuits, such as the address command input circuit 22, one or more of the decoders 14/16/18/20, or the like, for including trigger conditions therefrom.

Keeping the forgoing in mind, the data logging circuit 38 may be generally referred to as a recording circuit that receives a suspicious activity (SA) signal from the one or more sensors 40. Although described in terms of SA detection and general preventive operations, it should be appreciated that the data logging circuit 38 may record and/or track outputs from the sensors 40 for a variety of applications and/or purposes and may record and/or track parameters using any of the variations described above.

Figure 2:
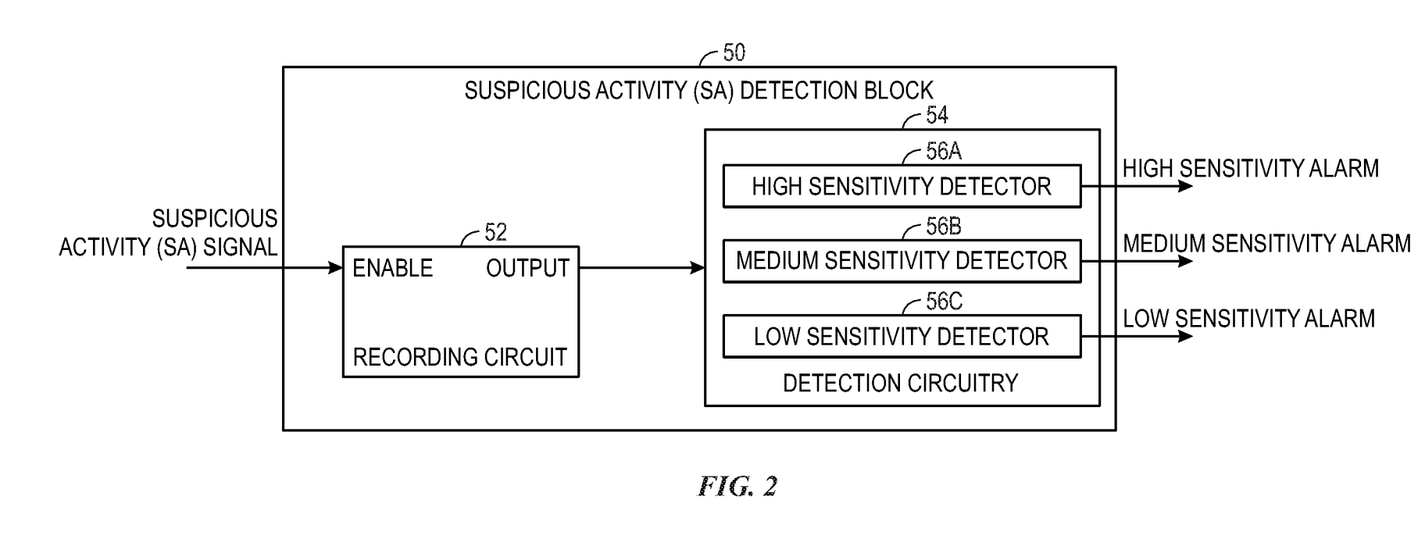
FIG. 2 is a block diagram of a suspicious activity detection block, in accordance with an embodiment of the present disclosure.

This relationship may be generalized in FIG. 2. FIG. 2 is a block diagram of a suspicious activity (SA) detection block 50. The example of the SA detection block 50 of FIG. 2 includes a recording circuit 52 and detection circuitry 54. The recording circuit 52 may be any suitable data logging and/or recording circuitry suitable for use with a memory device (e.g., memory device 10). The detection circuitry 54 may detect whether a particular input, or a particular operating condition, to the memory device 10 and/or the memory array 12 is of a suitable level to cause generation of an alarm. The particular inputs may include and/or be associated with a row hammering parameter, an accessing parameter, a temperature parameter, a voltage load parameter, a current load parameter, a stress parameter, or the like. In this way, the detection circuitry 54 may include detectors of varying sensitivities to detect different levels or urgencies of alarms. For example, the detection circuitry 54 includes a high sensitivity detector 56A, a medium sensitivity detector 56B, and a low sensitivity detector 56C, each respectively capable of outputting a separate alarm corresponding to a respective urgency level of an input signal.

The suspicious activity (SA) signal may be received via the recording circuit 52. In response to receiving the SA signal, the recording circuit 52 may record one or more parameters about the signal and vary its output to the detection circuitry 54 based at least in part on the one or more parameters as recorded over time. The detection circuitry 54 may receive the output from the recording circuit 52 and determine whether a value of the output is suitably high to activate one of its alarms.

Figure 3:
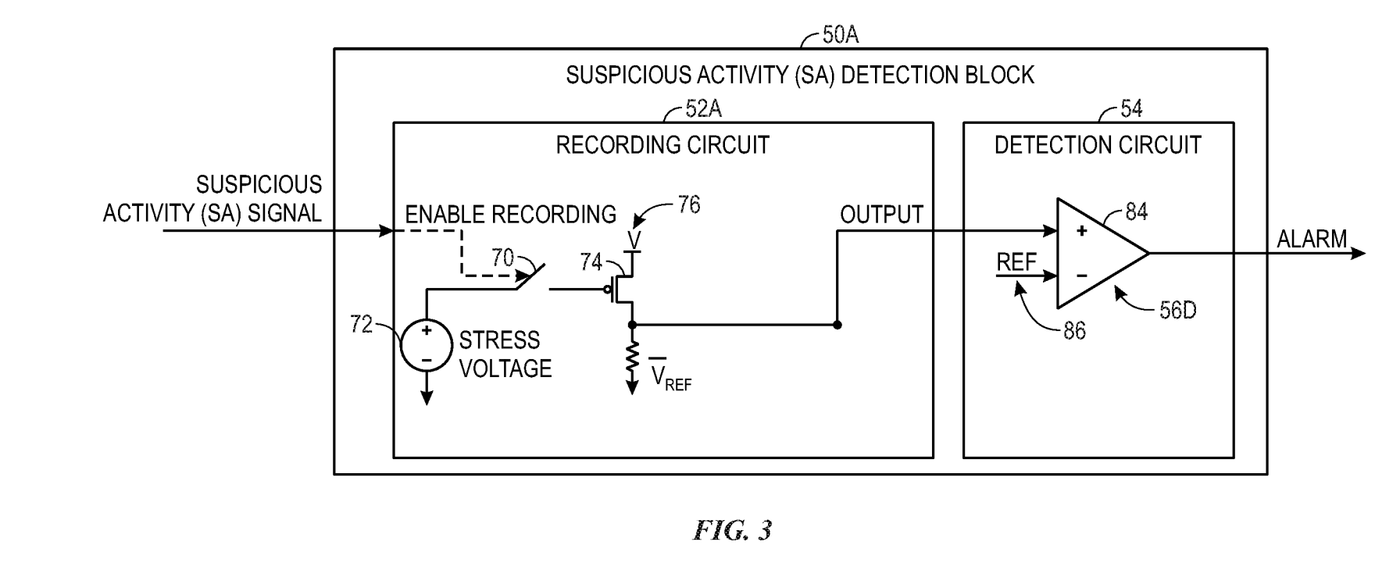
FIG. 3 is a block diagram of an example of the suspicious activity detection block of FIG. 2, in accordance with a second embodiment of the present disclosure.

An example of the SA detection block 50 is shown in FIG. 3. FIG. 3 is a block diagram of a first example SA detection block 50A. The SA detection block 50A includes an example of a recording circuit 52A that uses at least some of the data logging circuit 38 to record one or more parameters associated with the SA signal. As depicted, the SA signal actuates a switch 70 within the recording circuit 52A. The switch 70 may be any suitable device that actuates in response to a control signal. Thus, the parameter of the SA signal that this example of the recording circuit 52A records is the duration of time that the SA signal is enabled (e.g., logic high for the circuitry and/or "1").

When the switch 70 is actuated, a stress voltage 72 is applied to a gate of a transistor 74. Once the SA signal is disabled (e.g., logic low for the circuitry and/or "0"), the switch 70 returns to its zero-state and the stress voltage 72 is stopped from being applied to the gate of the transistor 74. Thus, the gate of the transistor 74 receives the stress voltage 72 for the duration of time that the SA signal is enabled.

It is noted that while the transistor 74 is depicted as a single transistor, the transistor 74 may be of any suitable component that may degrade a predictable amount. For example, the transistor 74 may represent a CMOS-degradation-based sensor that includes one or more PMOS and/or NMOS devices. Furthermore, in some embodiments, the transistor 74 may include one or more PMOS devices and/or NMOS devices. When the transistor 74 is a PMOS device, the transistor 74 may degrade according to NBTI and the gate of the PMOS device may be coupled to the stress voltage 72 and/or intervening logic (and/or components) between the PMOS device and the stress voltage 72, such as the switch 70. Additionally, the drain of the PMOS device may be coupled to the detection circuit 54, a resistor to ground, a feedback line to the intervening logic and/or components, or the like. When the transistor 74 is a NMOS device, the transistor 74 may degrade according to CHC. In these cases, the gate of the NMOS device may be coupled to the stress voltage 72 and/or intervening logic (and/or components) between the NMOS device and the stress voltage 72, the drain may be coupled to the stress voltage 72, and the source may be coupled to the detection circuit 54, a resistor to ground, a feedback line to the intervening logic and/or components, or the like.

Furthermore, in some embodiments, the transistor 74 may include a NMOS device and degrade according to a channel-initiated secondary electron generation (CHISEL). In this case, the NMOS device may have its gate coupled directly to the drain, where both the gate and the drain couple directly to the stress voltage. The NMOS device may have its source coupled to a relatively large resistor permitting a relatively large drain-to-bulk voltage (e.g., a high electric field). However, since the large resistor is coupled to the source, the current used to degrade the NMOS device is maintained relatively small, enabling power consumption to remain relatively low during degradation.

In each of these described examples, the transistor 74 may degrade a predictable amount based at least in part on the amount of time that the stress voltage 72 is received via the gate. An output from the transistor 74 (e.g., a voltage output from the drain and/or source of the transistor 74) may generally change based at least in part on the amount of degradation the transistor 74 has cumulatively undergone while a driving voltage (V) (e.g., reference arrow 76) remains generally constant. Thus, a particular sensitivity detector 56D of the detection circuitry 54 may use the output from the transistor 74 to determine whether or not an alarm is to be generated in response to the how long the SA signal has been enabled over time. For example, the sensitivity detector 56D may include a comparison circuit (e.g., a comparator 84) that compares the output from the transistor 74 to a reference value (e.g., reference voltage 86, a suitable reference current) to determine whether the output from the transistor 74 is large enough to activate an alarm.

The alarm generated may be used to notify an operator when the suspicious activity has occurred longer than a suitable amount of time. The suitable amount may be defined by the sensitivity detector 56D and/or by the reference value. In this way, the alarm output from the comparator 84 may be used to drive an alarming circuit, may be used as a signal to initiate notifying the operator, may be received by a control system and/or a control circuit that changes an operation of the memory device 10 in response to the alarm, or the like.

Figure 4:
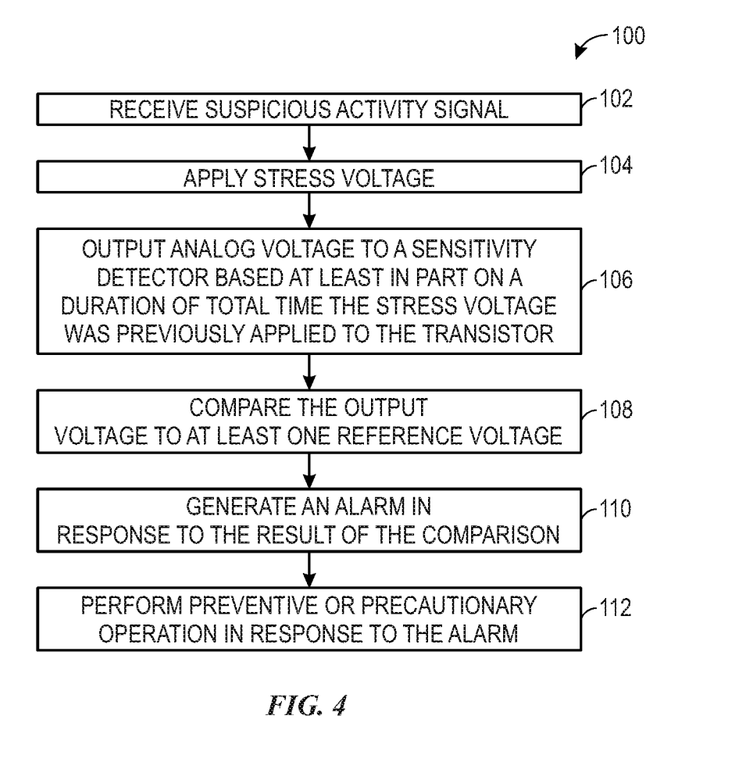
FIG. 4 is a flowchart for operating the suspicious activity detection block of FIG. 3, in accordance with the second embodiment of the present disclosure.

FIG. 4 is a flowchart of a method 100 for operating the SA detection block 50. Generally, the method 100 includes an SA detection block receiving a suspicious activity (SA) signal (block 102), applying a stress voltage (block 104), outputting an analog voltage to a sensitivity detector based at least in part on a duration of total time the stress voltage was previously applied to the transistor (block 106), comparing the output voltage to at least one reference voltage (block 108), generating an alarm in response to the result of the comparison (block 110), and performing a preventive and/or precautionary operation in response to the alarm (block 112). It should be understood that although the particular operations of the method 100 are described in a particular sequence, these operations may be performed in any suitable order. Furthermore, although the method 100 is described as performed by the SA detection block 50, it should be understood that any suitable system and/or circuitry (e.g., circuitry in conjunction with a control system) may perform the operations described.

At block 102, the SA detection block 50 may receive a suspicious activity (SA) signal. The SA detection block 50 may receive the SA signal at the recording circuit 52. In response to receiving the SA signal, the SA detection block 50 may, at block 104, apply a stress voltage 72 to the transistor, such as at least to a gate (e.g., a gate contact) of the transistor 74. Applying the stress voltage 72 may degrade the transistor 74 by a predictable amount.

At block 106, an analog output voltage from the recording circuit 52 (e.g., voltage output from the transistor 74) may be transmitted to a sensitivity detector 56. A voltage value of the output voltage may be based at least in part on a cumulative duration of time that the stress voltage 72 was previously applied to the transistor 74.

At block 108, the SA detection block 50 may compare the output voltage to at least one reference voltage 86. The SA detection block 50 may use the sensitivity detector 56 (including a comparator 84) to compare at least the output voltage and the reference voltage 86. The reference voltage 86 may be selected to correspond to an amount of degradation corresponding to a particular duration of time that the stress voltage 72 was applied to the transistor 74. In this way, for the sensitivity detector 56 may provide an alarm, generate an alarm, produce an alarm, trip an alarm, or the like, when the output voltage exceeds a relatively low reference voltage 86 in the cases when short durations of time (of the stress signal being applied) warrant an alarm or monitoring, while the sensitivity detector 56 may provide an alarm, generate an alarm, produce an alarm, trip an alarm, or the like, when the output voltage exceeds a relatively high reference voltage 86 for the cases when long durations of time (of the stress signal being applied) warrants an alarm or monitoring.

At block 110, the SA detection block 50 may generate an alarm in response to the result of the comparison at block 108. The alarm may be a voltage signal from the comparator 84 indicating that the output voltage from the recording circuit 52 was greater than the reference voltage 86. This alarm may be output from the comparator 84 and received by a control system internal to the memory device 10 (e.g., internal-to-DRAM) and/or external to the memory device 10 (e.g., external-to-DRAM). The control system may perform a preventive operation in response to receiving the alarm. A control system internal to the memory device 10 may respond to the alarm by changing one or more operations of the memory device 10. However, a control system external to the memory device 10 may respond to the alarm by performing one or more external operations relative to the memory device 10. For example, the control system may set an additional alarm (e.g., audible alarm, visible alarm, or the like) to be addressed by an operator. The control system may additionally or alternatively perform an additional computing action, such as generating an email notification, a pop-up notification, or otherwise computer-generated alert to be presented to an operator via a graphical user interface (GUI). Furthermore, the control system may respond by tracking alarms over time and use this information to monitor system or network-wide behaviors, such that alarms between separate memory devices 10 may be correlated and/or compared to improve monitoring of a network.

At block 112, the SA detection block 50 may sometimes perform a preventive or precautionary operation in response to the alarm. In these cases, the SA detection block 50 may include a respond circuit (not shown in figures of SA detection block 50). The operation of the respond circuit may decrease a likelihood that the memory device 10 is operated to exceed the first operational parameter. The SA detection block 50 via the respond circuit may perform different operations in response to different alarms, and any suitable combination of alarms and operations may be used in the systems and methods described herein.

Furthermore, some examples of the SA detection block 50 may reset the recording circuit 52 in response to determining the recording circuit 52 has been in operation long enough to suffer degradation or otherwise be operating undesired. The recording circuit 52 may be reset by reversing degradation to the transistor 74, replacing the transistor 74 with a fresh and/or new transistor, or the like.

Figure 5:
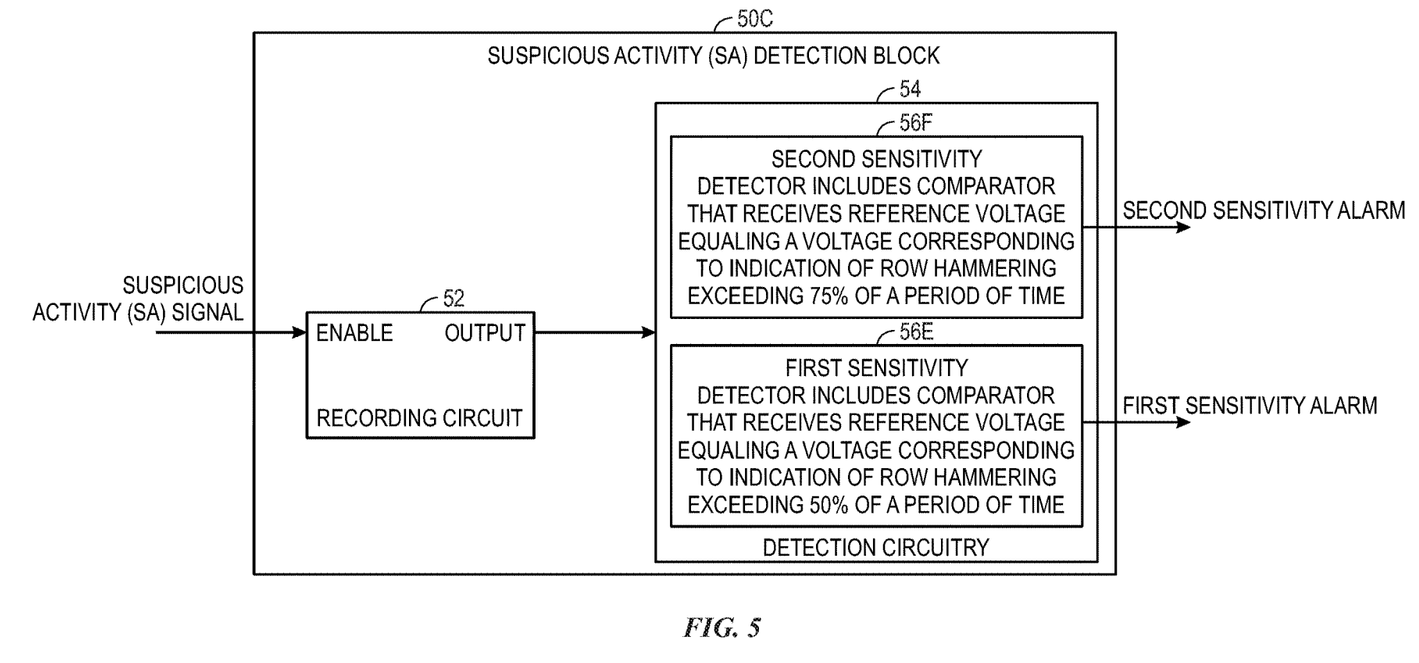
FIG. 5 is a block diagram of a second example of the suspicious activity detection block of FIG. 2, in accordance with a third embodiment of the present disclosure.

Keeping the forgoing in mind, FIG. 5 is a block diagram of a second example of the SA detection block 50, SA detection block 50C. In some cases, the recording circuit 52 of any suitable construction may be used with detection circuitry 54. The detection circuitry 54 may have any suitable number of sensitivity detectors 56. For example, the detection circuitry 54 may have two or more sensitivity detectors 56.

In this depicted example, the SA detection block 50C shares one recording circuit 52 between two sensitivity detectors 56. Each sensitivity detector 56 may monitor for a different parameter to be exceeded. For example, the first sensitivity detector 56E may compare the output voltage to a first reference voltage 86 indicative that a stress voltage (e.g., stress voltage 72 or other suitable stress voltage) has been applied for a duration of time exceeding half of a recording period, while the second sensitivity detector 56F may compare the output voltage to a second reference voltage 86 indicative of the stress voltage 72 being applied for 75 percent (%) of the recording period. In this example, the stress voltage 72 is applied in response to row hammering operations being performed to the memory device 10. The row hammering operations may include detecting accessing a same row address of the memory device 10 repeatedly over a particular duration of time. In this way, the SA signal may be transmitted in response to a detection of a particular row addressing suspicious activity, which may be used to intentionally degrade a transistor 74 to capture a duration of time that particular row addressing occurred. Further, the reference voltage 86 may correspond to a voltage level indicative of an output voltage corresponding to an expected output voltage of a transistor 74 that has been intentionally degraded for a particular duration of time (e.g., 75 percent (%) of a sensing period or sensing duration). Thus, the SA detection block 50C may monitor for particular row hammering behaviors exceeding particular durations of time.

Using a similar methodology, other parameters that correspond to suspicious activity may be tracked over time via the SA detection block 50. For example, the memory device 10 operating at a temperature greater than a maximum recommended operating temperature for at least a duration of time that exceeds half of a sensing duration (e.g., greater than or equal to 50% of a sensing duration) may indicate suspicious activity and may be desired to be monitored. It is noted that a sensing duration may be any suitable defined amount of time, including a total operating time of the memory device 10 or any suitable component of the memory device 10. As an additional example, the memory device 10 operating at a voltage greater than a maximum recommended operating voltage for at least a duration of time that exceeds half of a sensing duration (e.g., greater than or equal to 50% of a sensing duration) may indicate suspicious activity and may be desired to be monitored.

Figure 6:
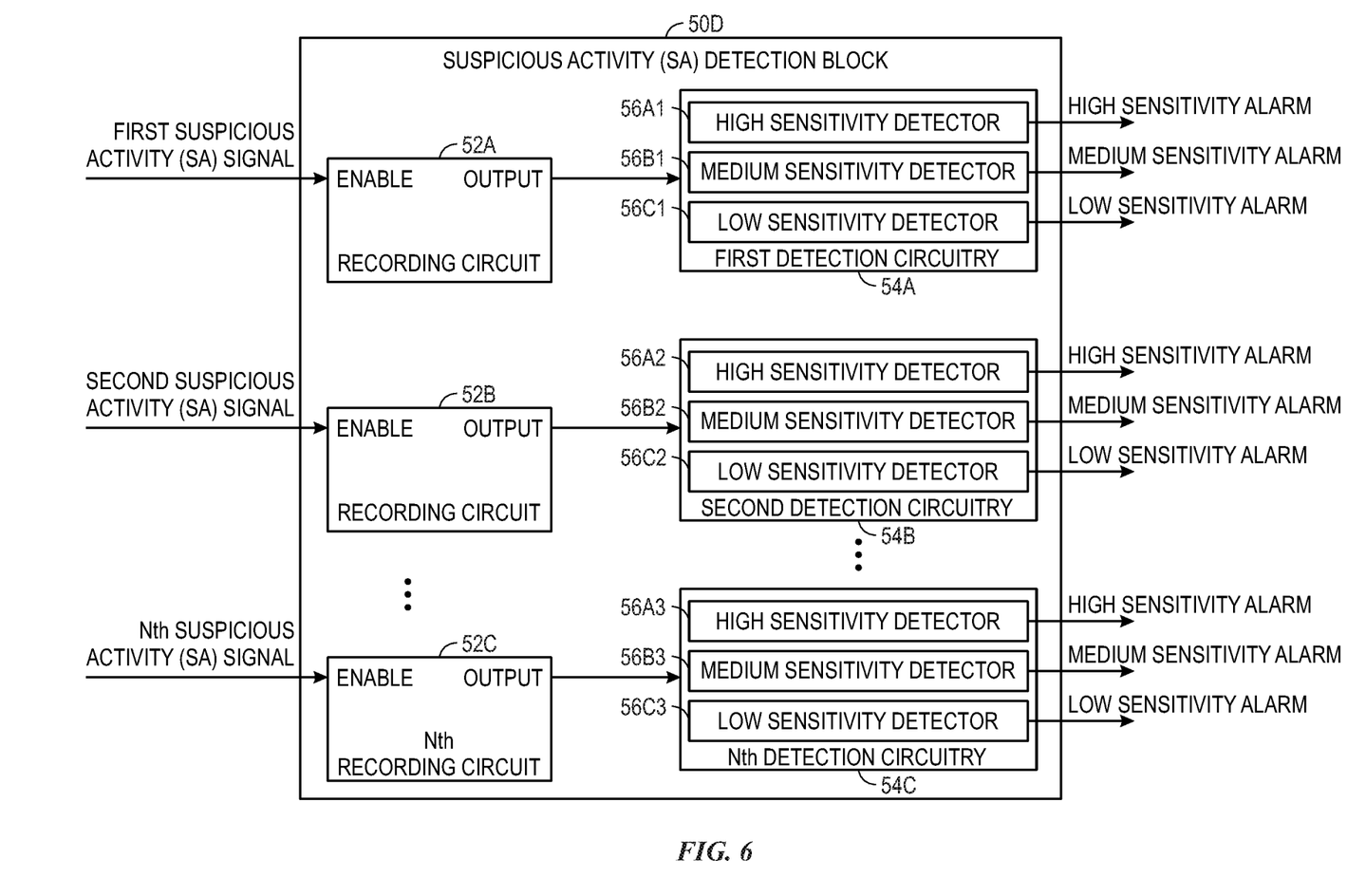
FIG. 6 is a block diagram of a third example of the suspicious activity detection block of FIG. 2, in accordance with a fourth embodiment of the present disclosure.

FIG. 6 is a block diagram of a third example of the SA detection block 50, SA detection block 50D. The SA detection block 50D may include any number of recording circuits 52 (52A, 52B, . . . , 52C) and any number of sensitivity detectors (56A1, 56B1, 56C1, 56A2, 56C3) within detection circuitry 54 corresponding to the recording circuits 52. In this way, a variety of parameters may be leveraged as enable inputs into the recording circuits 52 to correlate a stress voltage (e.g., stress voltage 72 or other suitable stress voltage) to a duration of time a particular operation was used or the memory device 10 was otherwise accordingly operated.

For example, the SA signal may be generated at least in part by pre-thresholding operations and/or other conversion operations (e.g., implementing two or more conditions before permitting the SA signal to be generated). In this way, the SA signal may correspond to an over-temperature condition, where the presence of the SA signal may indicate that a threshold temperature has been exceeded a particular length of time the memory device 10 is permitted to operate at that temperature during operation (permitting temperature to be monitored even if a direct sensing output of the threshold temperature may be unsuitable to transmit to the recording circuit 52). In that example, an over-temperature condition is monitored while counting circuitry tracks a duration of time the memory device 10 experienced the over-temperature operation, such that when the memory device 10 operates in the over-temperature for too long (e.g., defined via threshold amounts of durations of time), the instance of that particular operation occurring may initiate an SA signal to be generated and transmitted to a recording circuit 52.

The sensitivity detectors 56 may output respective alarms. When multiple sensitivity detectors 56 are used, the output alarms may correspond to differing intensities of alarm (e.g., low, medium, high, or the like) which may correspond to different operations, or different signaling techniques used to indicate to an operator that an alarm condition is present. For example, a low alarm may at least in part cause a powering-on of a light indicator while a high alarm may at least in part cause a powering-on of the light indicator and an additional light indicator and/or sound an audible alarm, or the like. Furthermore, in some embodiments, the intensities of alarm may be used to initiate generation of an email notification, a pop-up notification, or otherwise computer-generated alert to be presented to an operator via a graphical user interface (GUI). These previously described responses may be external-to-DRAM alarm responses. In some cases, alarm responses may including changing internal-to-DRAM operations. For example, adjusting a voltage, adjusting a timing delay, or the like.

In some embodiments, sensitivity detectors 56 may use reference voltages 86 defined relative to other voltages and/or other reference voltages 86. In this way, a first sensitivity detector 56 may use a reference voltage 86 that is at least twice a voltage value of a second sensitivity detector 56, a reference voltage 86 that is 1.5 times a voltage value of the second sensitivity detector 56, or any suitable combination of reference voltages. Since the rate at which the transistor 74 degrades is not linear with time, the reference voltages 86 may be adjusted to account for the non-linearity (e.g., reference voltages 86 may not be precise multiples of each other). Furthermore, in some embodiments, a high sensitivity detector 56 may output an alarm associated with a higher priority than an alarm generated by a low sensitivity detector 56. The relative priority between alarms may change how a control system that receives the alarms adjusts an operation of the memory device 10 in response to the alarms.

Thus, technical effects of the present disclosure include facilitating improved monitoring operations of memory devices to protect against undesired operations and/or unpermitted access of the memory devices. These techniques describe systems and methods for monitoring operations of the memory devices via a recording circuit that leverages cumulative degradation properties of semiconductor devices. As described, CMOS devices are discussed herein as being leveraged for these monitoring operations. However, any suitable semiconductor device that is able to be leveraged in cumulative degradation operations may be used in these systems and methods for monitoring the memory devices. An output from the recording circuit may have a value proportional, or otherwise related, to a value of the cumulative degradation experienced by the semiconductor device. In this way, the recording circuit output may be provided to a sensitivity detector to monitor the memory device operation, and generate an alarm signal when warranted. This described alarm system may benefit from each of the benefits afforded to the electronic devices/systems (e.g., the operation of the electronic devices/systems) and thus may provide an improved monitoring and/or detection circuit at the least in the ways described above and at the least relative to current monitoring and detecting techniques.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

In this way, in the examples described above, memory devices are described in the context of DRAM devices. Memory device configures in accordance with other embodiments of the present technology, however, may include other types of suitable storage media in addition to or in lieu of DRAM devices, such as devices incorporating NAND-based and/or NOR-based non-volatile storage media (e.g., NAND flash), magnetic storage media, phase-change storage media, ferroelectric storage media, or the like.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A device, comprising:
    a first recording circuit configured to track a first total duration of time indicative of each respective time duration that a circuit experiences a first operating condition via a first property degradation, wherein the first recording circuit is configured to apply a stress voltage to a transistor while the circuit experiences the first operating condition to contribute a respective amount of degradation to the first property degradation in response to the circuit experiencing the first operating condition, and wherein the first operating condition corresponds to an input associated with a row hammering parameter, an accessing parameter, a temperature parameter, a voltage load parameter, a current load parameter, a stress parameter, or any combination thereof; and
    a first detector circuit configured to generate a first alarm signal in response to determining that a drain voltage output from the transistor is greater than or equal to a first alarm reference voltage, wherein the drain voltage output from the first recording circuit is configured to indicate the first property degradation.

2. The device of claim 1, wherein the first detector circuit is configured to couple to a control system.

3. The device of claim 2, wherein the control system performs a preventive operation in response to receiving the first alarm signal.

4. The device of claim 1, comprising a second detector circuit configured to generate a second alarm at least in part by comparing the drain voltage output from the first recording circuit to a second alarm reference voltage.

5. The device of claim 4, wherein the second alarm reference voltage is at least twice as large as the first alarm reference voltage.

6. The device of claim 1, comprising a plurality of additional backup transistors used to track the first total duration of time in response to the circuit being operated in the first operating condition longer than an operational time period of one transistor.

7. The device of claim 1, comprising a second recording circuit configured to track a second duration of time that the circuit experiences a second operating condition via a second property degradation of another transistor.

8. The device of claim 7, wherein the first recording circuit and the second recording circuit are configured to output respective voltage values to the first detector circuit.

9. A method, comprising:
applying a stress voltage to a gate of a transistor for a duration of time, wherein the stress voltage is applied to the gate in response to a sensed value crossing a threshold value;
outputting a drain voltage of the transistor to a sensitivity detector, wherein an amplitude of the drain voltage is adjusted in response to the duration of time;
determining whether the drain voltage is greater than or equal to a reference alarm voltage;
generating an alarm signal in response to the determining that the drain voltage is greater than or equal to the reference alarm voltage; and
generating a higher priority alarm signal in response to determining that the drain voltage is greater than or equal to a larger reference alarm voltage than the reference alarm voltage.

10. The method of claim 9, comprising performing a preventive operation in response to the alarm signal.

11. The method of claim 9, wherein the stress voltage is configured to be applied in response to a switch closing, and wherein the switch is configured to close in response to receiving a suspicious activity signal generated in response to the sensed value crossing the threshold value.

12. The method of claim 9, wherein the amplitude of the drain voltage increases proportionally to the duration of time.

13. A system, comprising:
a memory device configured to be operated to exceed a first operational parameter;
a recording circuit configured to track a duration of time that the memory device is operated to exceed the first operational parameter;
a sensitivity detector configured to determine whether to generate an alarm signal based on a comparison of a drain voltage from the recording circuit to a first alarm reference voltage;
a control system communicatively coupled to the sensitivity detector, wherein the control system performs a preventive operation in response to receiving the alarm signal;
an additional recording circuit configured to track a duration of time that the memory device is operated to exceed a second operational parameter; and
an additional sensitivity detector configured to determine whether to generate an additional alarm signal in response to determining that an additional drain voltage from the additional recording circuit is greater than or equal to a second alarm reference voltage.

14. The system of claim 13, wherein the control system is configured to change an operation of the memory device such as to decrease a likelihood that the memory device is operated to exceed the first operational parameter.

15. The system of claim 13, wherein the control system is configured to perform an additional preventive operation in response to receiving the additional alarm signal, wherein the preventive operation is not a same operation as the additional preventive operation.

16. The system of claim 13, wherein the first operational parameter comprises a row hammering parameter, an accessing parameter, a temperature parameter, a voltage load parameter, a current load parameter, a stress parameter, or any combination thereof.

* * * * *